(No Model.)
2 Sheets—Sheet 1.
J. J. DEAL.
TWO WHEELED VEHICLE.
No. 334,939. Patented Jan. 26, 1886.
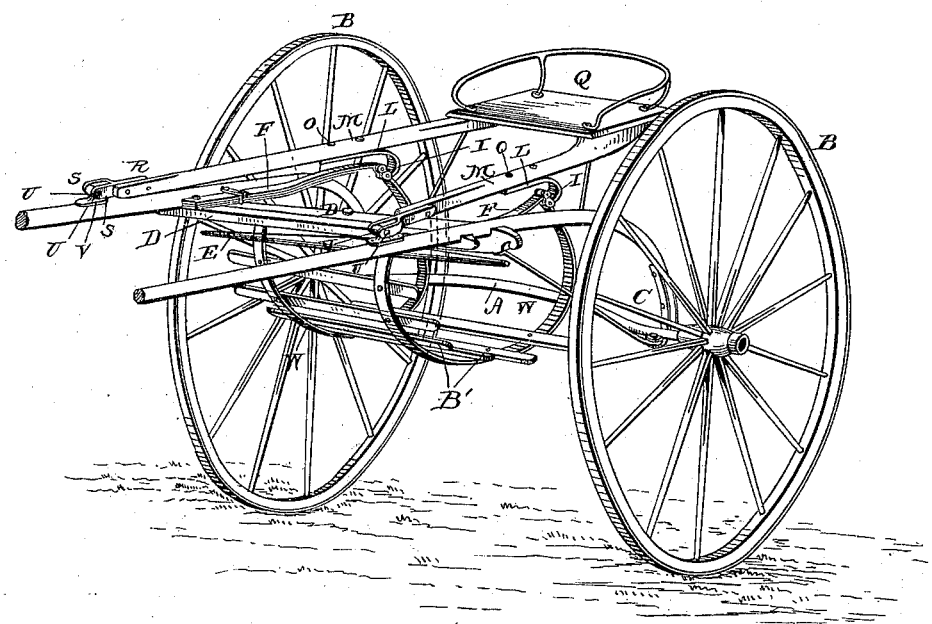
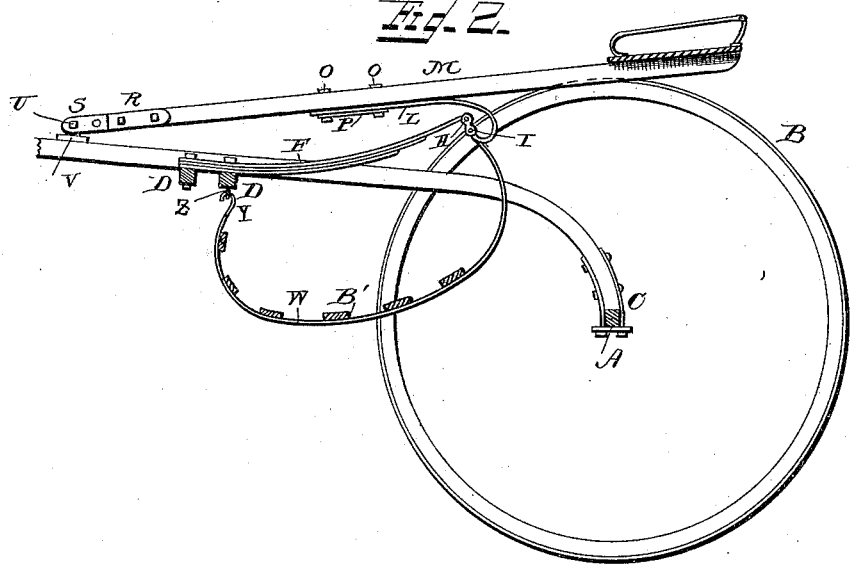
WITNESSES
F. L. Ourand
Edward Stanton
Jacob J. Deal
INVENTOR,
By Louis Bagger & Co.
Attorneys
N. PETERS, Photo-Lithographer, Washington, D. C.

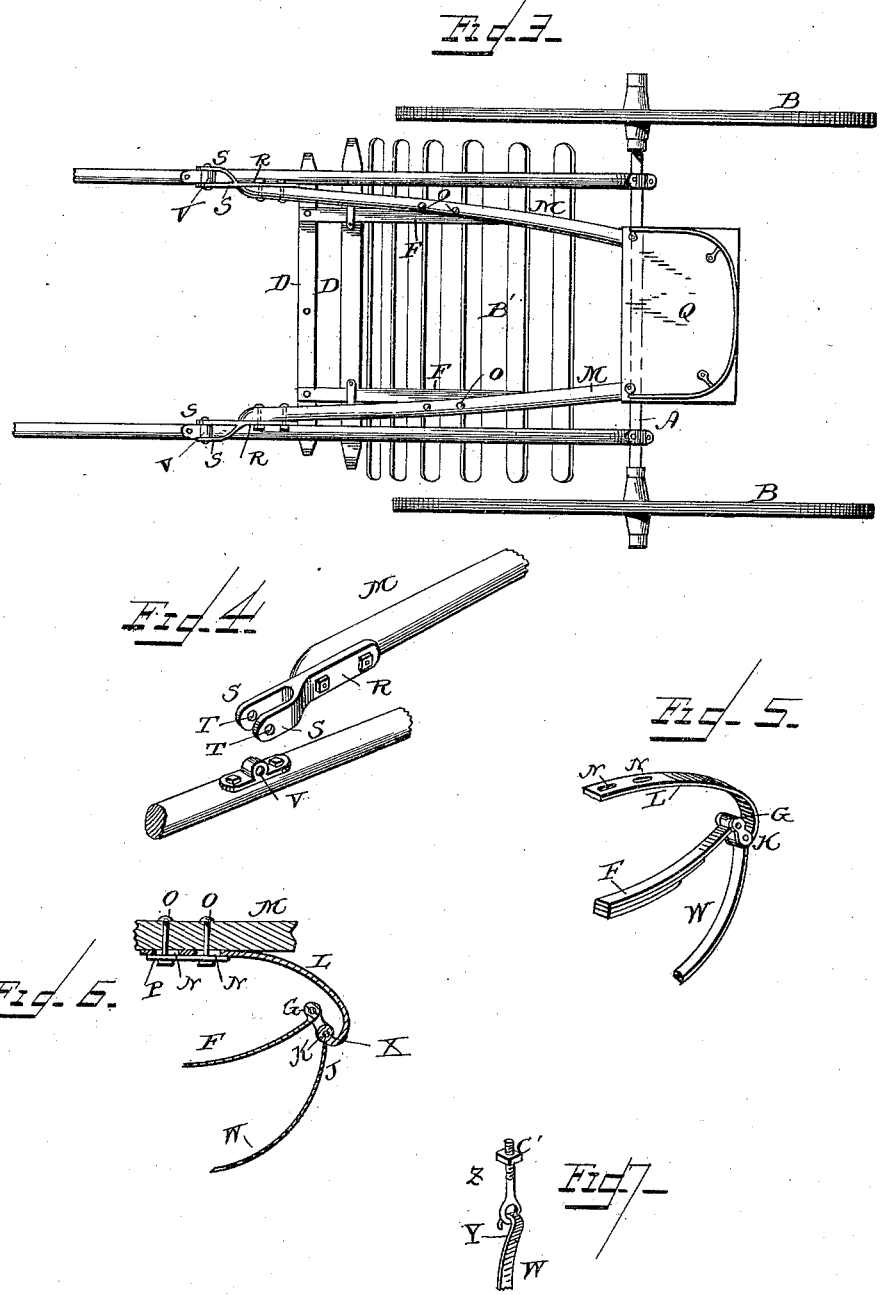

UNITED STATES PATENT OFFICE.

JACOB J. DEAL, OF JONESVILLE, MICHIGAN.

TWO-WHEELED VEHICLE.

SPECIFICATION forming part of Letters Patent No. 334,939, dated January 26, 1886.

Application filed December 4, 1885. Serial No. 184,721. (No model.)

*To all whom it may concern:*

Be it known that I, JACOB J. DEAL, a citizen of the United States, and a resident of Jonesville, in the county of Hillsdale and State of Michigan, have invented certain new and useful Improvements in Two-Wheeled Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved two-wheeled vehicle. Fig. 2 is a longitudinal vertical sectional view of the same. Fig. 3 is a top view of the vehicle. Fig. 4 is a perspective detail view of the coupling for the seat-supports. Fig. 5 is a similar view of the spring-support for the same. Fig. 6 is a vertical sectional detail view of the parts shown in Fig. 5, and Fig. 7 is a perspective detail view of the forward support for the slat bottom.

Similar letters of reference indicate corresponding parts in all the figures.

My invention has relation to that class of two-wheeled vehicles which are formed with regard to the seat and frame of the vehicle in a manner similar to a sulky, but which, for the sake of greater convenience, are provided with a bottom of slats, producing a vehicle which combines the light weight of a sulky with the convenience of a cart; and it consists in the improved construction and combination of parts of such a vehicle in which the several component parts are adjustable upon each other, so that the vehicle may be changed to suit the size and convenience of the person riding in the vehicle, and in which the seat and slat bottom are so hung that they will give and yield to the motion of the horse, as hereinafter more fully described and claimed.

In the accompanying drawings, the letter A indicates the curved axle, upon the ends of which the wheels B B are journaled, and to the ends of which the thills C C are clipped with their rear downwardly-bent ends. The thills or shafts are connected near their inner ends by two cross-bars, D D, secured at their ends to the shafts, and the single-tree E is pivoted upon the under side of the forward cross-bar.

Two flat slightly upwardly-curved springs, F F, are secured to the cross-bars at their forward ends, and the rear ends of these springs are formed with transverse eyes G, into which fit bolts H, having links I pivoted with their upper ends upon the ends of these bolts, and the lower ends of these links or shackles are similarly perforated and have bolts J passing through them, which bolts pass through eyes K, formed upon the downwardly, forwardly, and upwardly curved rear ends of two springs, L L, secured at their forward ends to the rearwardly-projecting inclined seat-supports M. The forward ends of these springs are formed with longitudinal slots N N, through which the fastening-bolts O pass, and a perforated bar or plate, P, is placed between the heads of these bolts and the spring, the bolts passing through the perforations in the plates and through the seat-supports.

The seat Q is secured between the rear ends of the seat-supports, and the forward ends of the said supports are formed with bars R, secured to the said ends, and having two forwardly-projecting lips, S S, provided with perforations T, through which a bolt, U, may pass, the lips having preferably two or more sets of perforations, so that the bolt may be inserted through perforations nearer to or farther from the end of the seat-support.

The upper sides of the shafts are provided with transverse eyes V, through which the bolts at the ends of the seat-supports may pass, the seat-supports being in this manner pivoted at their forward ends upon these bolts, and pivoted in such a manner that their fulcrum and the seat may be moved forward or back by adjusting the pivotal bolts in perforations nearer to or farther from the ends of the seat-supports.

Two straps, W W, are formed with transversely-perforated lips X at their rear ends, and these lips are pivoted upon the ends of the bolts, pivoting the rear ends of the upper seat-supporting springs between the shackles, and the forward ends of the straps are formed into hooks Y, which are hooked into eyes Z in the lower ends of bolts A', passing through the rear cross-bars. These straps are connected by means of cross-slats B', which form the slat bottom of the vehicle, and the eyed bolts which support the forward ends of the straps are screw-threaded upon their upper ends and provided with nuts C', so that they may be drawn higher up or be lowered in their perforations in the cross-bars, as it is desired to raise or lower the slat bottom. In this manner it will be seen that the seat may be drawn forward or back by adjusting the pivotal bolts in the lips at the forward ends of the seat-supports and by sliding the bolts at the seat-supporting springs in the longitudinal slots in the forward ends of the upper springs, thus throwing the weight of the person riding in the vehicle closer to the horse or farther from it, and the seat-supporting springs will yield and thus cushion the seat, and at the same time they will allow a certain amount of longitudinal swing or play, on account of the shackles connecting the springs so as to give or yield to the motion of the horse, and thus make riding in the vehicle more pleasant and smooth.

The slat bottom is so hung that it will give to the motion of the horse, and its forward end may be drawn farther up or be lowered at will by means of the nutted eyebolts, so that the said bottom may be adjusted to present a comfortable support for the feet in the different adjustments of the seat and its supports.

If it is desirable to render the vehicle as light as possible for racing purposes or other occasions for fast driving, the slat bottom may be unhooked at its forward end, and thereupon have the perforated lips of its straps removed from the bolts by withdrawing the bolts and again inserting them through the shackles and eyes of the springs after the lips of the straps have been removed, when the driver may rest his feet against the cross-bars while the vehicle is relieved of the weight of the slat bottom, and will not be more cumbersome than the usual racing-sulkies.

Having thus described my invention, I claim and desire to secure by Letters Patent of the United States—

1. In a two-wheeled vehicle, the combination of rearwardly-projecting seat-supports pivotally and adjustably secured to the shafts at their forward ends, and springs supported at their rear ends from the shafts and having longitudinal slots at their forward ends provided with bolts secured in the seat-supports, as and for the purpose shown and set forth.

2. In a two-wheeled vehicle, the combination of rearwardly-projecting inclined seat-supports secured pivotally and adjustably at their forward ends to the shafts, seat-supporting springs supported at their rear ends from the shafts and having longitudinal slots in their forward ends, plates having perforations registering with the slots in the springs and bearing against their under sides, and bolts passing through the perforations and slots into the seat-supports, as and for the purpose shown and set forth.

3. In a two-wheeled vehicle, the combination of the shafts having transverse eyes upon their upper sides and connected by cross-bars, seat-supports having lips at their forward ends formed with a series of perforations and connected to the eyes upon the shafts by bolts passing through them, flat springs secured at their forward ends to the cross-bars and having transverse eyes at their slightly upwardly-turned rear ends, springs having longitudinal slots in their forward ends sliding adjustably upon bolts upon the seat-supports, and having eyed downwardly and forwardly and upwardly curved rear ends, and links or shackles pivoted with their ends upon bolts passing through the eyed ends of the springs, as and for the purpose shown and set forth.

4. In a two-wheeled vehicle, the combination of the shafts connected by cross-bars, seat-supporting springs movably connected at their rear ends, straps pivoted at their rear ends to the joints of the springs and having cross-slats connecting them and hook-shaped forward ends, and eyed bolts having the hooked ends of the straps engaging their eyes and having their threaded and nutted upper ends fitting in perforations in the cross-bars, as and for the purpose shown and set forth.

In testimony that I claim the foregoing as my own I have hereunto affixed my signature in presence of two witnesses.

JACOB J. DEAL.

Witnesses:
GEORGE V. DEAL,
FREDK. COLLIER.